Patented Nov. 28, 1922.

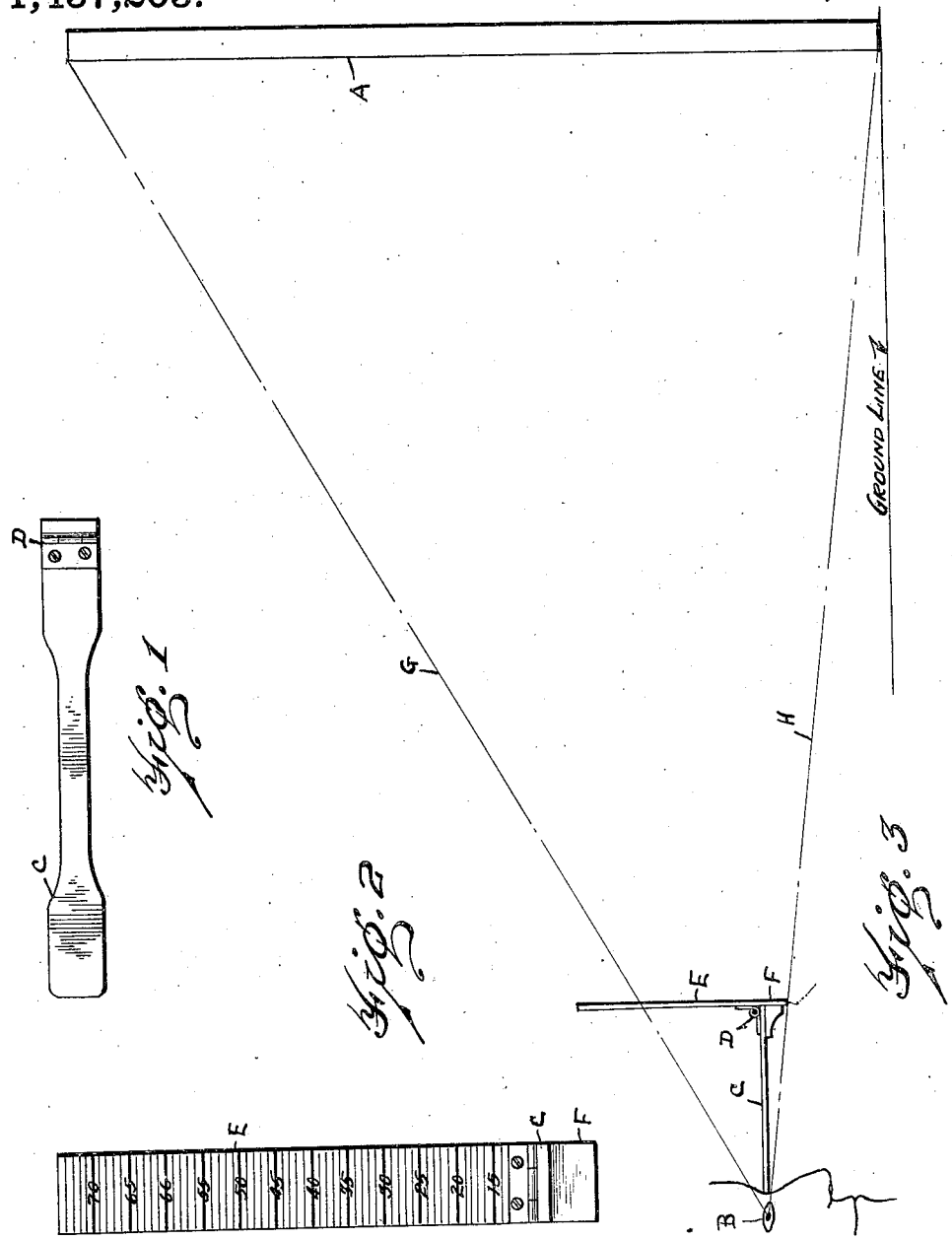

1,437,203

UNITED STATES PATENT OFFICE.

HOWARD P. SEELYE, OF HIGHLAND PARK, MICHIGAN.

MEASURING INSTRUMENT.

Application filed December 5, 1921. Serial No. 519,933.

*To all whom it may concern:*

Be it known that I, HOWARD P. SEELYE, a citizen of the United States, residing at Highland Park, county of Wayne, State of Michigan, have invented a certain new and useful Improvement in Measuring Instruments, and declare the following to be a full, clear, and exact description of the same, such as will enable others skilled in the art to which it pertains to make and use the same, reference being had to the accompanying drawings, which form a part of this specification.

This invention relates to apparatus for ascertaining the height of an object such as a tree or pole, and has for its object an improved organization of parts by which a lumberman or a telegraph lineman may quickly and with a fair degree of accuracy ascertain the height of a tree or pole, without the use of a transit or similar cumbersome and delicate apparatus, which requires not only careful carrying, but appreciable time in setting up. My apparatus is designed for convenient carriage in one's pocket, and the information that its use makes available has been found, after repeated tests under varying conditions, to give a measurement which is within such a few inches of entire accuracy, that, for the purposes to which it is directed, it is entirely acceptable and adequate.

In the drawings:

Figure 1 is a plan view of the horizontal "eye-sight" branch of the device.

Figure 2 is an elevational view of the vertical arm.

Figure 3 is a partly diagrammatic view, showing the device held in position relatively to the eye of a user, and with lines extending therefrom to the base and to the top of the object to be measured; in this view, the size of the user's features and of the instrument itself relatively to the lines just mentioned, and as regards the ground and top lines, are greatly exaggerated.

A indicates a pole or other object, whose approximate height it is desired to ascertain, and the eye B of the user's face may be assumed to be at an average height of about five feet two inches above the ground. The horizontal eye-sight member C of my improved device is held with its free end just beneath the user's eye and in a horizontal plane, while the vertical branch, foldably united to the opposite end thereof by means of the hinge D, is held in vertical position. For the purposes of explanation of the particular size scale E here used, let it be assumed that the user stands at a distance of 75 feet from the base of the object to be measured. The length of the lower branch F of the vertical member is such, proportionally to the length of the horizontal eye-sight member C and to the assumed level of the user's eye above the ground, that when the lower end of the branch F lies in the direct descending line H from the user's eye to the base of the object to be measured, the upright member when positioned perpendicularly to the eye-sight member C, must lie in a truly vertical position. The positioning of the hinge D on the vertical member regulates the length of the lower branch F, and of course if some other separating distance from the pole to be measured than the seventy-five foot distance here suggested were used, the length of the lower branch F would have to be modified somewhat accordingly. In other words, at this distance the relative length of the lower branch F acts as a verifier or compensator for this assumed distance of the height above the ground of five feet two inches assumed for the upper end of the dropping oblique line from the user's eye to the base of the pole A. The two parts C and E may be conveniently held in truly perpendicular position to one another by pressure of the user's thumb upon the squaring block J. With the apparatus in this position a "sight" is then taken from the user's eye to the top of the object to be measured, indicated by the dot and dash line G in Figure 3, and the point at which this imaginary line crosses the scaled vertical piece E may be taken as the approximate height of the object to be measured, as for example forty-five or fifty feet.

It is of course obvious that other arbitrary distances, either greater or less than that selected for illustration herein, may be adopted as the distance from the pole at which the user is to take his station, provided the size of the scaling E, as well as the length of the lower section F, be modified accordingly. However, a user who desires to employ this quickly, and carry it conveniently meantime folded up in his pocket, need attempt no such computation or change of scaling, so long as, with the particular article with which he is equipped, he adheres to the prescribed horizontal distance from the object to be measured. And even if the height of the user be such that his eyes as he stands are quite a few inches lower or higher than the assumed average of five feet two inches, I have found that a surprisingly small increase in the variation from complete accuracy of readings results.

What I claim is:

The combination, with a member having a selected major portion of its length provided with graduated markings, of a second member connected at one of its ends with that point on the first named member at which its graduated markings end, the length of said last named member relatively to the portions of the first named member on each side of their point of hinging being such that at a predetermined distance from the base of the object to be measured and at a certain vertical height thereabove, a line drawn from the free end of the last named member, when the same is held in horizontal position, will pass directly through the end of the shorter portion of the first named member to the base of the object to be measured, and a line drawn from said free end to the top of the object to be measured will intersect the graduated portion of the first named member at a point indicating the height of the object.

In testimony whereof, I sign this specification in the presence of two witnesses.

HOWARD P. SEELYE.

Witnesses:
 WILLIAM M. SWAN,
 JEFFERSON G. THURBER.